United States Patent
Schwartz et al.

(10) Patent No.: US 11,934,515 B2
(45) Date of Patent: Mar. 19, 2024

(54) MALWARE DETERRENCE USING COMPUTER ENVIRONMENT INDICATORS

(71) Applicant: Bank of America Corporation, Charlotte, NC (US)

(72) Inventors: Nera Pershing Schwartz, Singapore (SG); Harish Tammaji Kulkarni, Singapore (SG); Kumudini Choyal, Tung Chung (HK); Mahesh Ramesh Bane, Maharashtra (IN); Vaibhav Shankar Tambe, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 188 days.

(21) Appl. No.: 17/540,778

(22) Filed: Dec. 2, 2021

(65) Prior Publication Data
US 2023/0177144 A1 Jun. 8, 2023

(51) Int. Cl.
H04L 29/06 (2006.01)
G06F 21/53 (2013.01)
G06F 21/56 (2013.01)
H04L 9/40 (2022.01)

(52) U.S. Cl.
CPC ............ *G06F 21/53* (2013.01); *G06F 21/566* (2013.01); *H04L 63/1416* (2013.01); *H04L 63/145* (2013.01)

(58) Field of Classification Search
CPC ... G06F 21/566; G06F 21/53; H04L 63/1416; H04L 23/145
See application file for complete search history.

(56) References Cited

U.S. PATENT DOCUMENTS

| | | |
|---|---|---|
| 8,201,246 B1 | 6/2012 | Wu et al. |
| 8,875,289 B2 | 10/2014 | Mahaffey et al. |
| 9,571,520 B2 | 2/2017 | Ramabhatta et al. |
| 9,760,715 B2 | 9/2017 | Rothwell |

(Continued)

FOREIGN PATENT DOCUMENTS

| | | | |
|---|---|---|---|
| KR | 20180029047 A | 3/2018 | |
| RU | 2566329 C2 | 10/2015 | |
| WO | WO-2020006415 A1 * | 1/2020 | ........... G06F 21/566 |

OTHER PUBLICATIONS

Caltagirone et al., "The Four Types of Threat Detection With Case Studies in Industrial Control Systems (ICS)"; https://www.dragos.com/wp-content/uploads/The_Four_Types-of_Threat_Detection.pdf; article; 15 pages; Jul. 13, 2018; Dragos Inc., Maryland.

(Continued)

*Primary Examiner* — Tri M Tran
(74) *Attorney, Agent, or Firm* — Banner & Witcoff, Ltd.

(57) ABSTRACT

A system for inoculating a computer network against malware is described. Specifically, environmental indicators used by anti-analysis and target filtering mechanisms of a malware program may be determined based on analysis within a virtual or physical sandbox environment. The environmental indicators may be sent to computing devices associated with the computing network. The malware program, based on the environmental indicators, may be spoofed to assume that a computing device is associated with an anti-malware system, and/or is a device that is not to be infected. Based on this assumption, the malware program may not execute within the computing device.

19 Claims, 7 Drawing Sheets

(56) References Cited

U.S. PATENT DOCUMENTS

| | | |
|---|---|---|
| 9,858,416 B2 | 1/2018 | Niemela et al. |
| 10,133,863 B2 | 11/2018 | Bu et al. |
| 10,181,026 B2 | 1/2019 | Stolfo et al. |
| 2017/0132411 A1* | 5/2017 | Salajegheh ............. G06F 21/53 |

OTHER PUBLICATIONS

Kelly, "Indicators of Compromise TeslaCrypt Malware"; https://www.giac.org/paper/gcia/11671/indicators-compromise-teslacrypt-malware/149373; Global Information Assurance Certification Paper; 23 pages; Feb. 16, 2017; the SANS Institute.

Lindorfer, "Detecting Environment-Sensitive Malware"; https://publik.tuwien.ac.at/files/publik_273621.pdf; Master's Thesis; 76 pages; Apr. 11, 2011; Vienna University of Technology.

* cited by examiner

MALWARE DETERRENCE USING COMPUTER ENVIRONMENT INDICATORS

FIELD

Aspects described herein generally relate to the field of malware protection, and more specifically to leveraging environmental indicators used by malware anti-analysis and target filtering behaviors for malware protection.

BACKGROUND

Information security is an important aspect of enterprise organizations. Malware attacks (e.g., phishing attacks, cyberattacks, ransomware) on a company's systems trigger violations that can pave the way to compliance issues, disciplinary actions, and loss of reputation. Several current systems, as may be implemented by an enterprise organization, have perimeter layer controls in place that monitor and detect suspicious activity, but may involve a lot of manual human intervention. In addition, a drawback of these current systems is that there are no proactive measures in place to prevent malware execution if a computing device does get exposed to a malware program.

SUMMARY

Aspects of the disclosure provide solutions that address and overcome technical problems associated with malware deterrence in a computing network. Specifically, methods, devices, and systems as described herein may use environmental indicators associated with anti-analysis and target filtering mechanisms of a malware program for inoculating a computing network.

In accordance with one or more arrangements, a malware security platform may comprise at least one processor; and memory storing computer-readable instructions that, when executed by the at least one processor, cause the malware security platform to perform one or more operations. The malware security platform may query a malware database to determine an environmental indicator based on analysis of a malware program in a sandbox environment, wherein the environmental indicator is used by at least one of an anti-analysis mechanism and a target filtering mechanism associated with the malware program to prevent execution in the sandbox environment. The malware security platform may generate, based on the environmental indicator, an inoculation message for transmission to one or more computing devices in a computing network. In an arrangement, the inoculation message may comprise the environmental indicator. The malware security platform may send, to the one or more computing device, the inoculation message. The inoculation message may cause the one or more computing devices to integrate the environmental indicator into corresponding computing environments of the one or more computing devices.

In some arrangements, the malware security platform may determine the environmental indicator based on: determining that the malware program has not executed within the sandbox environment, and determining that the environmental indicator corresponds to the sandbox environment. An environmental indicator may consist of any mutable or immutable aspect of a computer system, though it is typically an aspect which is profiled or otherwise inferred by an application/program (malicious or legitimate) in its decision making process on whether to execute.

In some arrangements, the environmental indicator may be at least one of: a registry entry in the sandbox environment; a file system structure of the sandbox environment; hardware information associated with the sandbox environment; or combinations thereof.

In some arrangements, the anti-analysis mechanism may prevent execution of malware program based on detection of a registry entry indicating a malware analysis application. In some arrangements, the target filtering mechanism may prevent execution of malware program based on detection of a registry entry indicating a specified keyboard language. In some arrangements, the environmental indicator may be a registry entry and wherein the integrating the environmental indicator comprises adding the registry entry to respective system registries of the one or more computing devices.

In some arrangements, the malware database comprises indications of a plurality of malware programs and associated environmental indicators.

In some arrangements, the malware security platform may present a user interface configured to receive user input for at least one of: modifying the malware database; selecting the one or more computing devices; or combination thereof.

In some arrangements, the malware security platform may receive information indicating that at least a second computing device in the computing network is infected with the malware program. The sending the inoculation message may be based on receiving the information.

In some arrangements, the malware security platform may determine whether the environmental indicator is within a predetermined percentile of environmental indicators, in the malware database, arranged in a priority order from lowest priority to highest priority. The sending the inoculation message may be based on determining that the environmental indicator is within the predetermined percentile of environmental indicators.

In some arrangements, the malware security platform may determine the priority order of the environmental indicators based on respective quantities of malware programs using the environmental indicators.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Malware may be defined as any piece of software that may perform unauthorized operations in a computer system and/or a network. Malware may correspond to trojans, spyware, adware, rootkits, ransomware, worms, keyloggers, or any other type of malicious software. Malware may also have a capability to redistribute itself through a network to spread itself among multiple computer systems. Targets for malware may range from individual users to governmental and enterprise organizations. Malware may be used to exfiltrate confidential information, damage computing systems/networks, and/or other nefarious purposes. For example, malware may be used to target an enterprise organization (e.g., a financial organization, such as a bank) to steal confidential information associated with clients of the enterprise organization.

Figure 1:
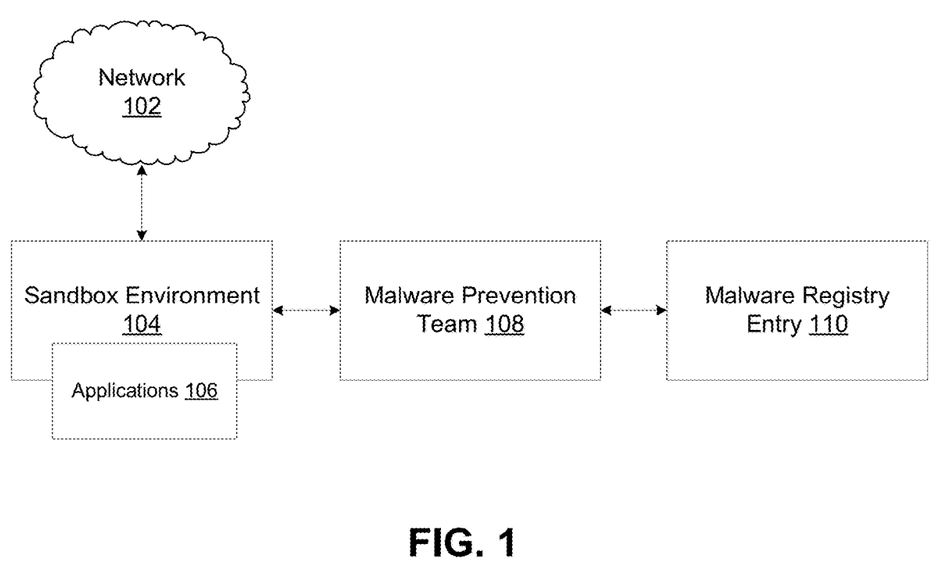
FIG. 1 shows an example procedure for detecting malware based on manual review, in accordance with one or more example arrangements.

Enterprise organizations may have controls in place for malware detection, including but not limited to manual review by security analysts and automated anti-malware tools. FIG. 1 shows an example procedure for detecting malware based on manual review using various security tools. A malware prevention team 108 may analyze communications transmitted/received via a network 102 to determine whether data associated with the communication may correspond to malware. The network 102 may comprise a private network/enterprise network associated with the enterprise organization. The network 102 may comprise a public network (e.g., Internet) which may be accessed by various devices in the private network. In an arrangement, the analyzed communications may correspond to data received/transmitted by computing devices (e.g., via email, or any other form of electronic communication) associated with the network 102, documents/files loaded on to a computing device via an external storage drive, traffic associated with a webpage, etc. The data may be analyzed in the sandbox environment 104 (e.g., a virtual machine) by the malware prevention team 108 to determine whether the data may be associated with malware. The sandbox environment 104 may comprise various applications/tools 106 that may be used for the analysis.

Analyzing the data may comprise identifying various characteristics associated with the data (e.g., signature associated with the data; registry entries associated with the document/file; a folder where the document/file, or suspicious code associated with the document/file, was placed in; websites assessed by the document/file; location of files being modified by the data, etc.) based on its operation within the sandbox environment 104. In an arrangement, analyzing the data may comprise identifying any changes initiated by the data (e.g., registry changes, group policies changes, executed PowerShell scripts, etc.) within the sandbox environment 104. For example, the malware prevention team 108 may determine whether any registry entries associated with the data correspond to malware registry entries (e.g., using a known database of malware registry entries). As another example, the malware prevention team 108 may determine whether the data is causing/attempting to cause the virtual machine to communicate with a malicious server. Based on the identified characteristics of the data, the malware prevention team 108 may determine whether the data is associated with a malware program. The malware prevention team 108 may, if the data is associated with a malware program, delete a malware registry entry 110 corresponding to the malware program from a system registry associated with an operating system used in the enterprise network (thereby sabotaging its operation), or remove the malware program itself in totality from the enterprise network. The malware prevention team 108 may, for example, update an anti-malware tool to cause deletion of the malware registry entry 110 in computing devices associated with the enterprise network. In an example where the data is associated with an email, the malware prevention team 108 may initiate processes for blocking the email from reaching its intended destination. In an arrangement, the malware prevention team 108 may initiate processes for sending an alert indication to a computing device on which malware was detected. One or more of the above processes may be automated and performed by an automated anti-malware tool.

Such approaches, however, have their limitations. For example, manual review may be performed only periodically (e.g., once every 24 hours) and may result in delayed detection of an infection. Control mechanisms such as that of FIG. 1, or automated anti-malware tools, may not have a capability to initiate proactive measures for preventing malware execution on an enterprise network. A computer or a network may have already been infected and compromised by malware before it may be detected by the malware prevention team 108 or an anti-malware tool. Further, traditional anti-malware approaches rely on various indicators associated with malware execution for detection (e.g., as described above). More sophisticated malware programs may be equipped with mechanisms that increase difficulty of its detection using these approaches. For example, malware programs may comprise anti-analysis mechanisms that prevent execution on environments associated with network security systems (e.g., sandbox environments, etc.), and target filtering mechanisms that enable targeted attacks on certain computers. Anti-analysis mechanisms in the malware program may prevent its execution (or obscure its malicious operation) if the malware program detects that it is running in the virtual machine/sandbox environment, or any environment that may be potentially used for malware analysis. Because the malware program is not executed (or its malicious operation obscured), the malware prevention team 108 may misclassify the malware program as non-malicious. The target filtering mechanism in the malware program may cause the malware to selectively execute when it infects a target computing system (e.g., an administrative computer, database server, computers in a specific geographic region, etc.). As such, the malware program may remain undetected within a network until it infects its target computing system.

Anti-analysis and target filtering mechanisms of a malware program may use various conditions and/or indicators (e.g., environmental indicators) associated with a computing environment to determine whether or not to execute. Various examples described herein may enable a computing system to spoof these conditions and/or indicators to ensure that a malware program is not executed. In this manner, instead of relying on indicators that result from malware execution for malware detection and system protection (e.g., as described with respect to FIG. 1), the approaches described herein enable a computing system to "inoculate" computing devices by determining and distributing these conditions and/or indicators to the computing devices.

An anti-analysis mechanism associated with a malware program may prevent malware analysis by network security systems. For example, security researchers may use various tools (e.g., sandbox environments, virtual machines, specialized software, etc.) for malware analysis. The anti-analysis mechanism may determine whether a computer environment that it is in is associated with any of such tools. For example, a registry entry in an operating system of a computer environment may indicate that it is associated with a virtual central processing unit (CPU) (e.g., the computer environment is a virtual machine). The anti-analysis mechanism of a malware may determine this registry entry and prevent malware execution, thereby preventing malware analysis. As another example, a registry entry in an operating system of a computer environment may indicate that a particular software tool used for malware analysis is operational within the computer environment. The anti-analysis mechanism of a malware program may determine that the software tools is installed based on the registry entry and prevent malware execution (e.g., or perform an operation that may be considered benign by security researchers).

A target filtering mechanism may limit malware program to execute on specific computer systems/networks. A target filtering mechanism may be included in a malware program by a malicious actor to delay detection and/or attack specific high value targets. Another reason for using a target filtering mechanism may be to avoid legal repercussions associated with attacking computing systems located in a country in which a malicious actor is a resident of. For example, laws in a country may only be directed against infecting computer systems in the same country. The malicious actor, who may be a resident of the country, may include target filtering mechanisms that avoid malware execution on computer systems that are located within the country. An example target filtering mechanism in a malware program may determine a keyboard language associated with a computer system (e.g., using a registry entry) and, based on determining that the keyboard language corresponds to a specific country, avoid execution.

Figure 2:
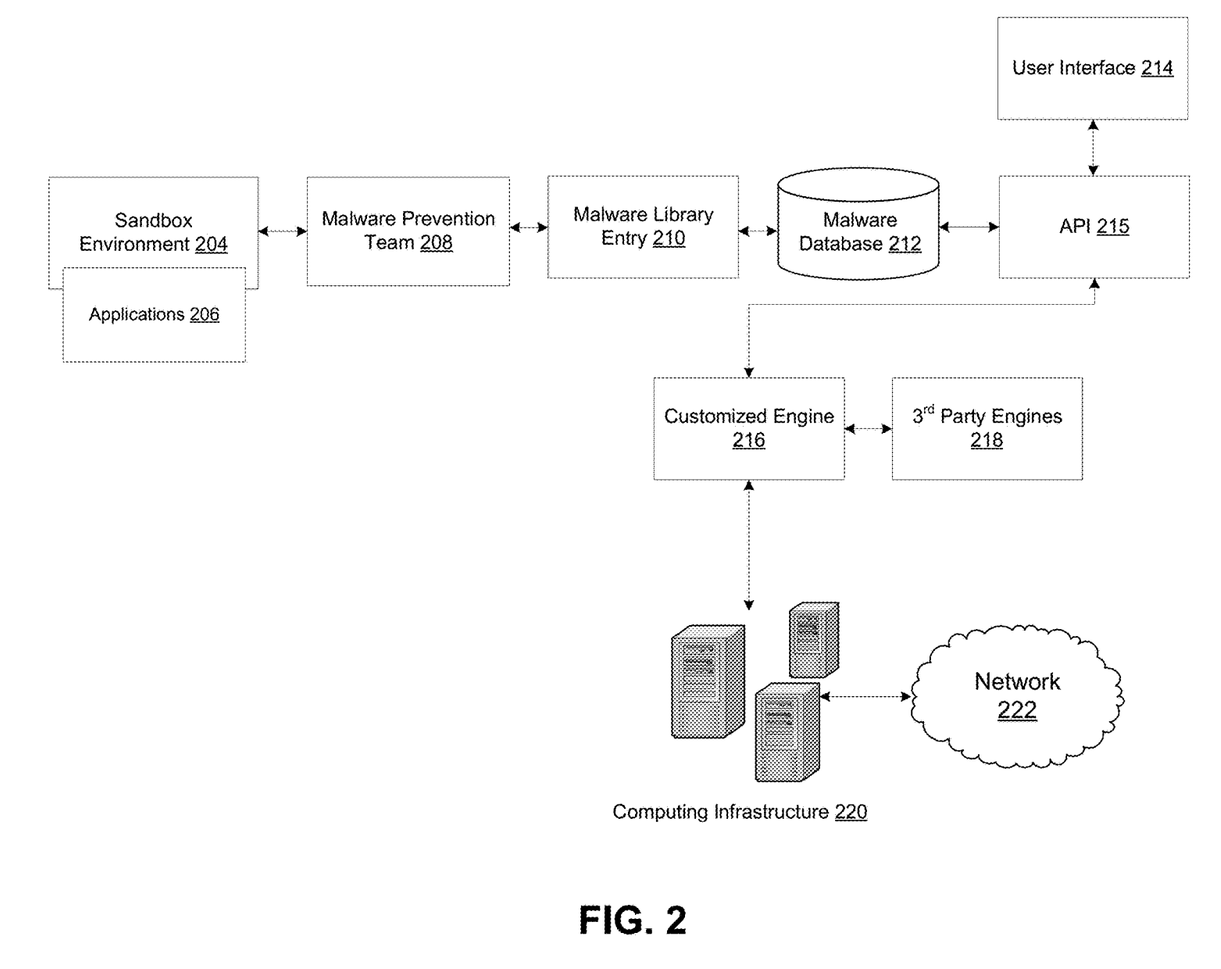
FIG. 2 shows an example system for inoculation of computing devices in a network based on environmental indicators used by anti-malware and/or target filtering mechanisms, in accordance with one or more example arrangements.

FIG. 2 shows an example system for inoculation of computing devices in a network based on environmental indicators used by anti-malware and/or target filtering mechanisms. A sandbox environment 204 may analyze data/files within an enterprise network (e.g., network 222) to determine whether the data/files correspond to a malware program. For example, the data/files may correspond to a received email attachment at a computing device, data loaded via an external hard drive/USB drive, etc. In an arrangement, the sandbox environment 204 may comprise one or more applications 206 to analyze the data/files (e.g., in accordance with the procedures described with reference to FIG. 1).

Based on the analysis within the sandbox environment, if the data/file is determined to correspond to a malware program, a malware library entry 210 may be generated. The malware library entry 210 may comprise an indication of the malware program. Analyzing the malware program may further comprise determining whether the malware program has built-in anti-analysis and/or target filtering mechanism. This analysis may be performed by the malware prevention team 208 by reviewing any code associated with the malware program, determining whether the malware program has executed within the sandbox environment, etc. Based on the analysis, one or more environmental indicators used by the anti-analysis and/or the target filtering mechanism may be determined and added to the malware library entry 210 corresponding to the malware program. The environmental indicators may correspond to conditions and/or indicators within the sandbox environment which may cause the malware program to not execute within the sandbox environment (based on anti-analysis and/or target filtering mechanisms of the malware program).

In an arrangement, the malware program may comprise an anti-analysis mechanism that determines whether a computer environment that it is in may be associated with any analysis or security tools, and/or otherwise may be used for malware analysis. In this case, the malware library entry 210 may include an indication of the malware program and further indicate one or more environmental indicators used by the malware to make this determination. For example, an environmental indicator may be a virtual CPU indicator (e.g., a registry entry, operating system indicator) as may correspond to a virtual machine used for malware analysis. As another example, environmental indicators used in anti-analysis mechanisms may correspond to registry entries corresponding to specific security tools (e.g., a packet capturing tool for network monitoring, etc.) used for malware analysis.

In an arrangement, the malware program may comprise a target filtering mechanism that limits malware execution to certain computing networks/devices. In this case, the malware library entry 210 may include an indication of the malware program and further indicate one or more environmental indicators used by the malware to determine whether or not execute in a computer network/device. With reference to the example where the target filtering mechanism avoids malware execution on computer systems that are located within a specific country, an environmental indicator may correspond to hardware information that may be associated with that country (e.g., a registry entry that indicates a keyboard language corresponding to the country). As another example, an environmental indicator may be an indication of a specified file system structure (e.g., which may be indicative of a computing network/device within which the malware program is configured to not execute).

Figure 3:
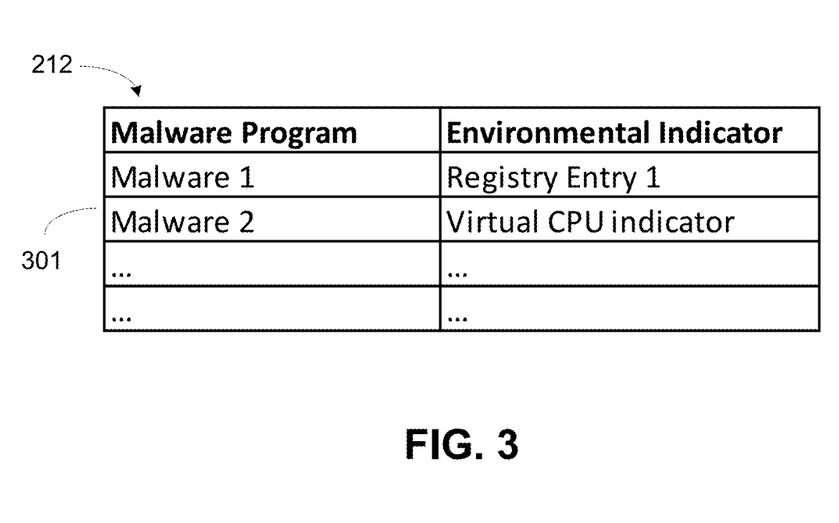
FIG. 3 shows example malware library entries in a malware database, in accordance with one or more example arrangements.

A malware database 212 may store a plurality of malware library entries (e.g., corresponding to a plurality of malware programs). FIG. 3 shows example malware library entries in the malware database 212. Each library entry 301 in the malware database 212 may indicate a malware program and corresponding one or more environmental indicators used in corresponding anti-analysis and target filtering mechanisms.

An application programming interface (API) 215 may interface the malware database 212 with various applications and engines of systems. For example, the API 215 may enable reviewing/modifying entries in the malware database 212 (e.g., by an administrative user) via a user interface 214 (e.g., as provided in an administrative user computing device). In an arrangement, the user interface 214 may be used to add/delete entries from the malware database 212. In an arrangement, the user interface 214 may be used to initiate sending of one or more messages to one or more computing devices (e.g., computing infrastructure 220) in the enterprise network 222 for malware inoculation based on the malware library entries.

The API 215 may further interact with one or more engines (e.g., customized engine(s) 216, third party engine(s) 218) for enriching the data in the malware database 212 and for pushing environmental indicators to the computer infrastructure 220 for malware inoculation. The third party engine(s) 218 may comprise malware information from other security providers that may be used to enrich the malware database 212 (e.g., further determine how a particular malware program works, any additional environmental indicators used by the malware program, etc.). For example, the API 215 may, based on interacting with the third party engines, receive and add additional environmental indicators to malware library entries in the malware database 212. The third party engine(s) 218 may correspond to anti-malware programs that may be used to determine presence of specific malware programs within one or more computing devices in the computing infrastructure 220.

The customized engine 216 may send one or more inoculation messages to computing devices in the computing infrastructure 220. The one or more inoculation messages may comprise/indicate environmental indicator(s) associated with one or more malware library entries. The one or more inoculation messages may cause the computing devices to integrate the environmental indicator(s) into corresponding computing environments. In an arrangement where an environmental indicator is a registry entry, integrating the environmental indicator(s) may comprise adding the registry entry to respective system registries associated with the computing environments. Integration of the environmental indicators may protect the computing devices from malicious activity as may be performed by malware programs associated with the one or more library entries.

The sending of the one or more inoculation messages may be based on detecting malware programs (e.g., by the third party engine(s) 218) within one or more computing devices in the computing infrastructure 220. For example, environmental indicators associated with detected malware programs (e.g., as detected by third party engines 218) may be included in the inoculation messages.

For example, a malware library entry may comprise an indication of a first malware program and further comprise a virtual CPU indicator or a registry entry (e.g., of a security tool) used by the first malware program for an anti-analysis mechanism. An inoculation message, sent to one or more computing devices in the computing infrastructure 220, for the first malware program may comprise the virtual CPU indicator and/or the registry entry. Based on receiving the inoculation message, the one or more computing devices may add the virtual CPU indicator and/or the registry entry to their respective computing environments. The first malware program, if present on one of the one or more computing devices, may assume (e.g., based on the virtual CPU indicator or the registry entry) that it is present on a virtual CPU or is present on a computing device associated with a security analyst. Based on this determination and the anti-analysis mechanism of the first malware program, the first malware program may not execute.

As another example, a malware library entry may comprise an indication of a second malware program and further comprise a registry entry, indicating a specific keyboard language, as may be used by a target filtering mechanism of the second malware program. An inoculation message, sent to one or more computing devices in the computing infrastructure 220, for the second malware program may comprise the registry entry. Based on receiving the inoculation message, the one or more computing devices may add the registry entry to their respective computing environments. The second malware program, if present on one of the one or more computing devices, may assume (e.g., based on the registry entry) that it is present on a computing device located in a specific country (e.g., which a malicious actor might want to avoid infecting). Based on this determination and the target filtering mechanism of the second malware program, the second malware program may not execute.

The sending of inoculation messages to computing devices in the computing infrastructure 220 may be controlled via the user interface 214. For example, the user interface 214 may be used to select one or more computing devices (of the computing infrastructure 220) and further select one or more malware programs that the one or more computing devices are to be inoculated against. Based on the selections, the customized engine 216 may send one or more inoculation messages to the selected one or more computing devices. The one or more inoculation messages may comprise environmental indicators associated with the one or more malware programs, as may be used by corresponding anti-analysis and target filtering mechanisms of the one or more malware programs. The one or more inoculation messages may cause computing environments, associated with the one or more computing devices, to integrate the environment indicators.

The computing devices to which an inoculation message (e.g., comprising an environmental indicator associated with a malware program) may be based on a type of the malware program. In an arrangement, the malware database 212 may further include a type of the malware program (e.g., indication of device types that are susceptible to the malware program, where the device types may include application servers, database servers, personal computers, mobile devices, etc.). The customized engine 216 may send an inoculation message comprising an environmental indicator associated with a malware program to a computing device that may be susceptible to that malware program. For example, an environmental indicator for a malware program that is known to target server computers may be sent to server computers within the computing infrastructure 220.

Figure 4:
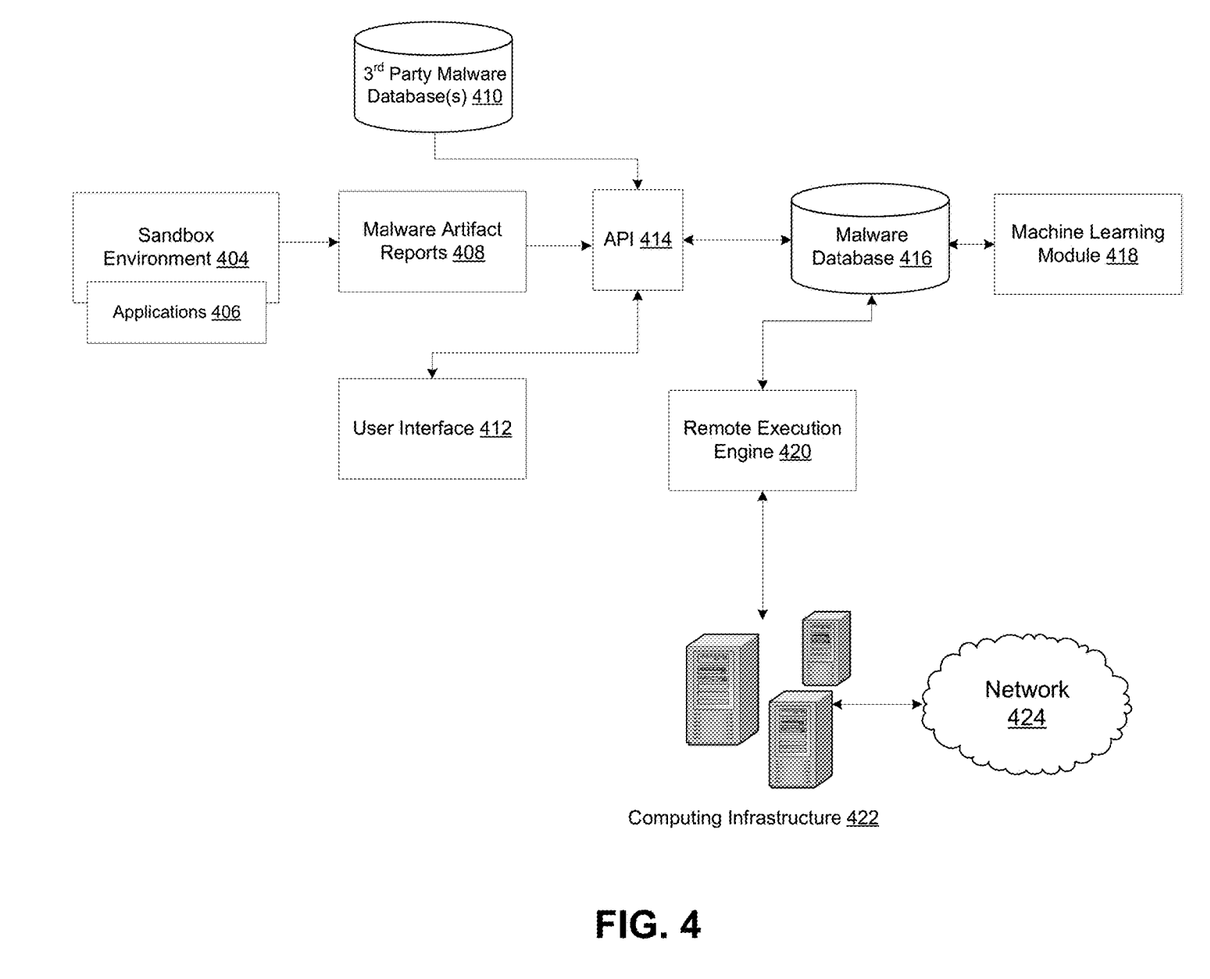
FIG. 4 shows further details associated with an example system for inoculation of computing devices in a network, in accordance with one or more example arrangements.

FIG. 4 shows further details associated with the example system for inoculation of computing devices in a network. The operations of a sandbox environment 404 and applications 406 may be similar to operations as described with respect to the sandbox environment 204 and the applications 206 in FIG. 2. Malware artifact reports 408 may be generated by the malware prevention team based on analysis within the sandbox environment 404. The malware artifact reports 408 may comprise a plurality of malware library entries (e.g., as shown in FIG. 3).

An API 414 may be used to interface the malware artifact reports 408 with a user interface 412 and a malware database 416 (e.g., similar to the malware database 212). For example, the user interface 412 may be used for reviewing/modifying entries in the malware database 416. In an arrangement, the user interface 412 may be used to add/delete entries (e.g., from the malware artifact reports 408) from the malware database 416. In an arrangement, the user interface 412 may be used to initiate sending of one or more messages to one or more computing devices (e.g., computing infrastructure 422) in the enterprise network 424 for malware inoculation based on the malware library entries.

The API 414 may also interface with malware data from third party malware databases 410 (e.g., provided by external organizations). The third party malware databases 410 may comprise malware information from other security providers that may be used to enrich the malware database 212 (e.g., further determine how a particular malware program works, any additional environmental indicators used by the malware program, prevalence of a malware program, etc.). For example, the API 215 may, based on interacting with the third party databases 410, receive and add additional environmental indicators to malware library entries in the malware database 416.

The machine learning (ML) module 418 may be used for deploying the inoculation in an efficient manner. For example, the ML module 418 may be used to determine a priority order for environmental indicators to be used for inoculation based on one or more criteria. The ML module 418 may determine a priority order for environmental indicators based on respective quantities of malware programs (e.g., in the malware database 416) that use the environmental indicators (e.g., for anti-analysis and target filtering mechanisms). Environmental indicators that are used by a larger number of malware programs may be prioritized for sending in inoculation messages. Other criteria may also be used for determining a priority order (e.g., probability of infection associated with a malware program, type of the malware program, etc.). For example, malware programs that are rarely seen may be given a lower priority than more common malware programs. In an arrangement, prevalence of specific malware programs may be determined based on information provided in third part malware database(s) 410.

The ML module 418 may further determine the computing devices within the computing infrastructure 422 within which the environmental indicators are to be deployed (e.g., via inoculation messages). For example, some malware programs may only be seen in server computers. Based on this determination, the ML module 418 may send environmental indicators associated with the malware programs to server computers in the computing infrastructure 422.

Various ML algorithms by the ML module 418 may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative ML algorithms may be used without departing from the invention.

The ML module 418 may generate an AI model based on historical malware library entries in the malware database 416 and the manual review (e.g., via the user interface 412) of the malware library entries. The AI model may be used to determine priorities of any new malware library entries that may be added to the malware database 416. For example, a neural network may be trained using historical malware library entries to determine a priority order for environmental indicators. An input to the neural network may be respective quantities of malware programs that use respective environmental indicators for anti-analysis and target filtering mechanisms, respective prevalence of malware programs in the malware database 416, respective types of malware programs in the malware database 416, etc. The output from the neural network may be an indication of a priority order of the environmental indicators.

The remote execution engine 420 (e.g., which may operate in a manner similar to the customized engine 216) may send one or more inoculation messages to computing devices within the computing infrastructure 422. The sending of the one or more inoculation messages (e.g., environmental indicators included in the one or more inoculation messages, and the specific computing device to which the one or more inoculation messages are to be sent) may be based on various criteria described with respect to FIG. 2.

Figure 5A:
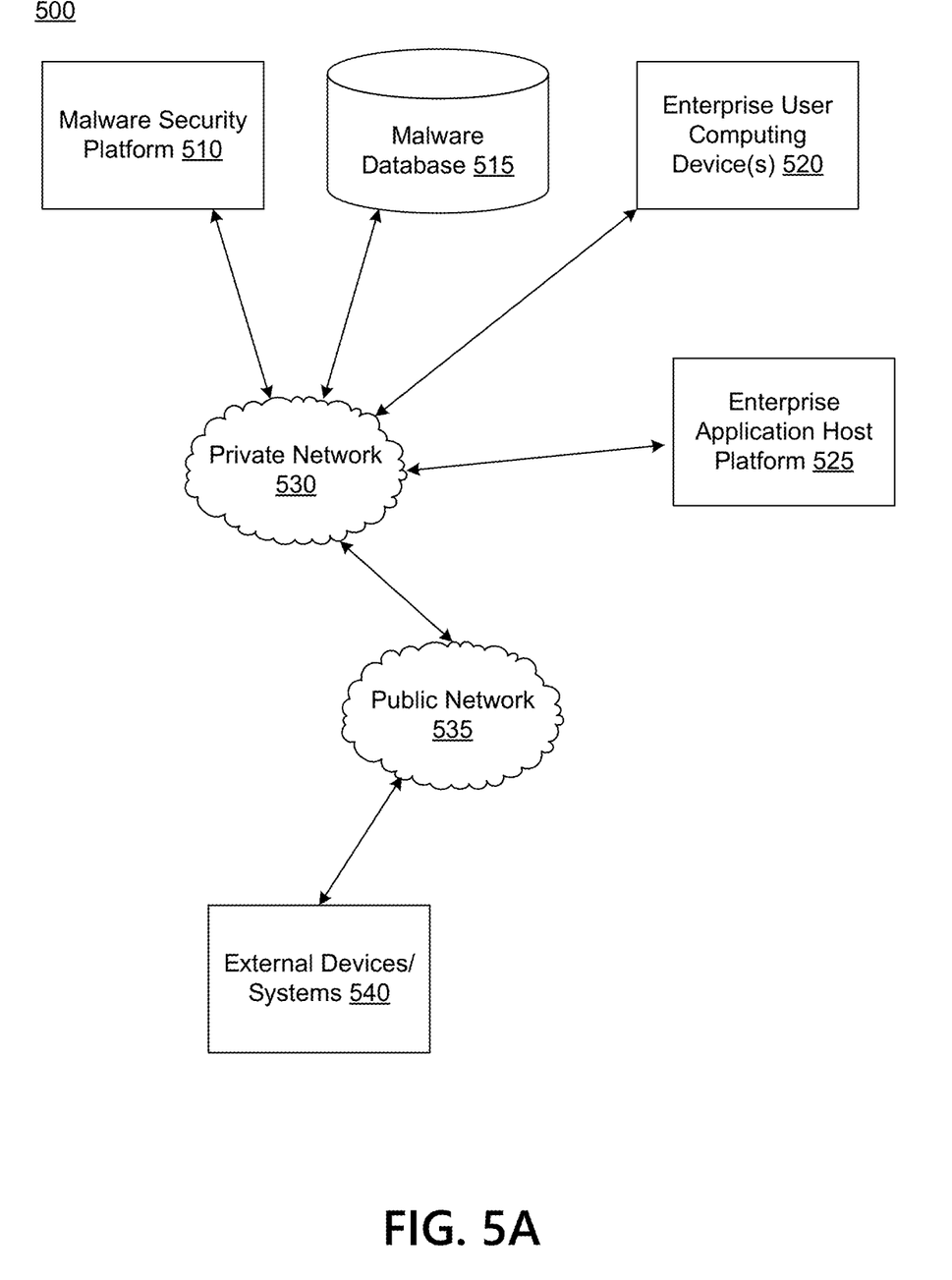
FIG. 5A shows an illustrative computing environment in which a malware inoculation system may be deployed, in accordance with one or more example arrangements.

FIG. 5A shows an illustrative computing environment 500 in which a malware inoculation system may be deployed, in accordance with one or more arrangements. The computing environment 500 may comprise one or more devices (e.g., computer systems, communication devices, and the like). The computing environment 500 may comprise, for example, a malware security platform 510, a malware database 515, an enterprise application host platform 525, and/or one or more enterprise user computing devices 520. The one or more of the devices and/or systems, may be linked over a private network 530 associated with an enterprise organization (e.g., a financial institution). The computing environment 500 may additionally comprise one or more external devices/systems 540 connected, via a public network 535, to the devices in the private network 530. The devices in the computing environment 500 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), and the like).

The malware security platform 510 may comprise one or more computing devices and/or other computer components (e.g., processors, memories, communication interfaces) configured to perform one or more functions as described herein. Further details associated with the architecture of the malware security platform 510 are described with reference to FIG. 5B.

The enterprise application host platform 525 may comprise one or more computing devices and/or other computer components (e.g., processors, memories, communication interfaces). In addition, the enterprise application host platform 525 may be configured to host, execute, and/or otherwise provide one or more enterprise applications. In an arrangement where the private network 530 is associated with a banking organization, the enterprise application host platform 525 may be configured, for example, to host, execute, and/or otherwise provide one or more transaction processing programs, such as an online banking application, fund transfer applications, and/or other programs associated with the financial institution. The enterprise application host platform 525 may comprise various servers and/or databases that store and/or otherwise maintain account information, such as financial account information including account balances, transaction history, account owner information, and/or other information. In addition, the enterprise application host platform 525 may process and/or otherwise execute transactions on specific accounts based on commands and/or other information received from other computer systems comprising the computing environment 500.

The enterprise user computing device(s) 520 may be personal computing devices (e.g., desktop computers, laptop computers) or mobile computing devices (e.g., smartphones, tablets). In addition, the enterprise user computing device(s) 520 may be linked to and/or operated by specific enterprise users (who may, for example, be employees or other affiliates of the enterprise organization). In an arrangement, the enterprise user computing device(s) 520 may be used to access a sandbox environment for malware analysis. The enterprise user computing device(s) 520 may be used to interact and/or modify a malware database, or initiate sending of inoculation messages. For example, one or more of the above operations may be performed via a user interface (e.g., the user interface 214 or the user interface 412) as may be presented on the enterprise user computing device(s) 520.

The external devices/systems 540 may comprise one or more computing device (e.g., user devices, servers, databases, etc.) that may interact with computing systems within the private network 530. For example, the user device(s) may be computing devices (e.g., desktop computers, laptop computers) or mobile computing device (e.g., smartphones, tablets) connected to the network 530. The user device(s) may be configured to enable the user to access the various functionalities provided by the devices, applications, and/or systems in the private network 530.

In one or more arrangements, the malware security platform 510, the enterprise application host platform 525, the enterprise user devices 520, the malware database 515, the external devices/systems 540, and/or the other devices/systems in the computing environment 500 may be any type of computing device capable of receiving input via a user interface, and communicating the received input to one or more other computing devices in the computing environment 500. For example, the malware security platform 510, the enterprise application host platform 525, the malware database 515, the enterprise user devices 520, the external devices/systems 540, and/or the other devices/systems in the computing environment 500 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the malware security platform 510, the enterprise application host platform 525, the malware database 515, the enterprise user devices 520, the external devices/systems 540, and/or the other devices/systems in the computing environment 500 may, in some instances, be and/or comprise special-purpose computing devices configured to perform specific functions.

Figure 5B:
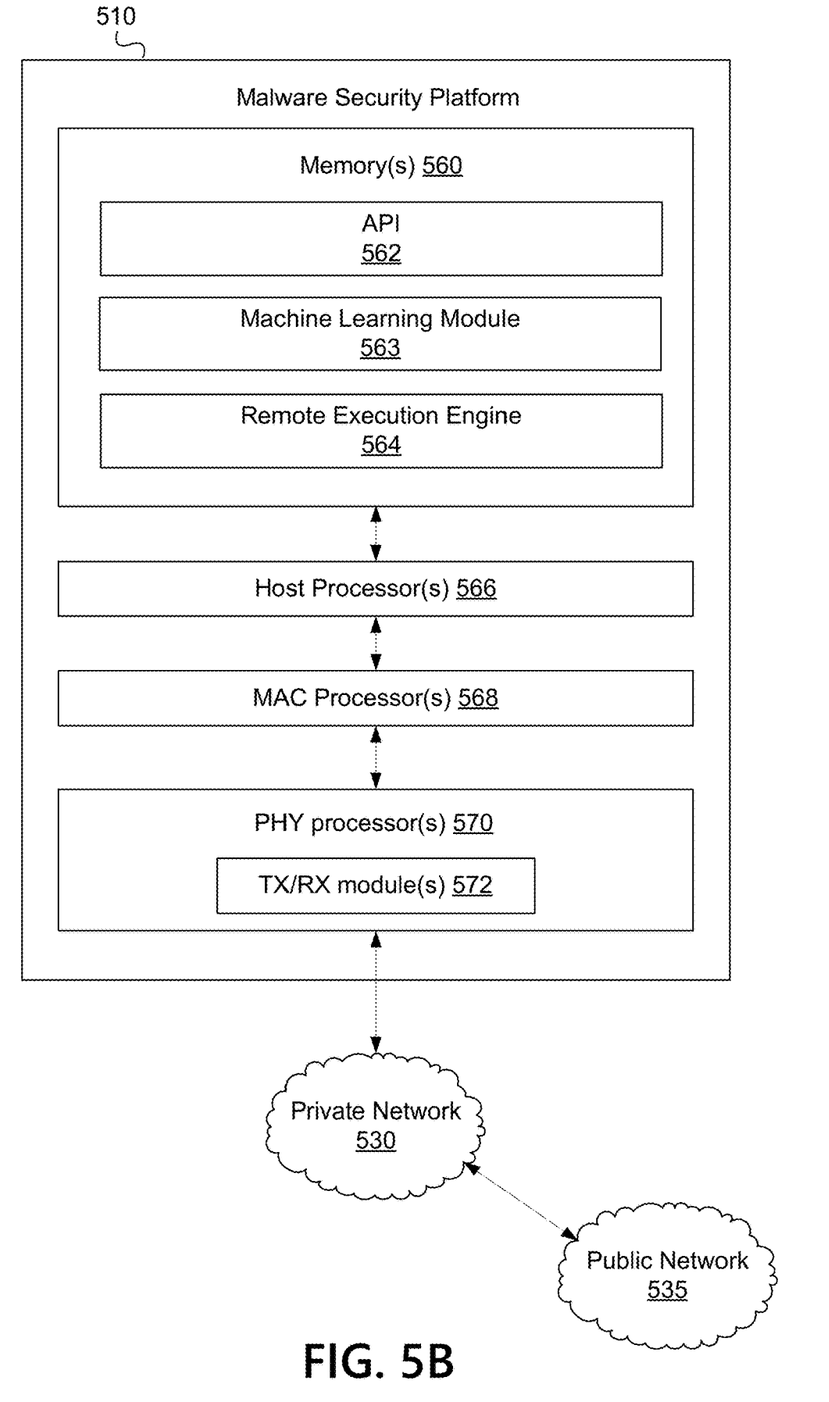
FIG. 5B shows an example malware security platform, in accordance with one or more example arrangements.

FIG. 5B shows an example malware security platform 510 in accordance with one or more examples described herein. The malware security platform 510 may comprise one or more of host processor(s) 566, medium access control (MAC) processor(s) 568, physical layer (PHY) processor(s) 570, transmit/receive (TX/RX) module(s) 572, memory 560, and/or the like. One or more data buses may interconnect host processor(s) 566, MAC processor(s) 568, PHY processor(s) 570, and/or Tx/Rx module(s) 572, and/or memory 560. The malware security platform 510 may be implemented using one or more integrated circuits (ICs), software, or a combination thereof, configured to operate as discussed below. The host processor(s) 566, the MAC processor(s) 568, and the PHY processor(s) 570 may be implemented, at least partially, on a single IC or multiple ICs. Memory 560 may be any memory such as a random-access memory (RAM), a read-only memory (ROM), a flash memory, or any other electronically readable memory, or the like.

Messages transmitted from and received at devices in the computing environment 500 may be encoded in one or more MAC data units and/or PHY data units. The MAC processor(s) 568 and/or the PHY processor(s) 570 of the malware security platform 510 may be configured to generate data units, and process received data units, that conform to any suitable wired and/or wireless communication protocol. For example, the MAC processor(s) 568 may be configured to implement MAC layer functions, and the PHY processor(s) 570 may be configured to implement PHY layer functions corresponding to the communication protocol. The MAC processor(s) 568 may, for example, generate MAC data units (e.g., MAC protocol data units (MPDUs)), and forward the MAC data units to the PHY processor(s) 570. The PHY processor(s) 570 may, for example, generate PHY data units (e.g., PHY protocol data units (PPDUs)) based on the MAC data units. The generated PHY data units may be transmitted via the TX/RX module(s) 572 over the private network 530. Similarly, the PHY processor(s) 570 may receive PHY data units from the TX/RX module(s) 572, extract MAC data units encapsulated within the PHY data units, and forward the extracted MAC data units to the MAC processor(s). The MAC processor(s) 568 may then process the MAC data units as forwarded by the PHY processor(s) 570.

One or more processors (e.g., the host processor(s) 566, the MAC processor(s) 568, the PHY processor(s) 570, and/or the like) of the malware security platform 510 may be configured to execute machine readable instructions stored in memory 560. The memory 560 may comprise one or more program modules/engines having instructions that when executed by the one or more processors cause the malware security platform 510 to perform one or more functions described herein. The one or more program modules/engines and/or databases may be stored by and/or maintained in different memory units of the malware security platform 510 and/or by different computing devices that may form and/or otherwise make up the malware security platform 510. For example, the memory 560 may have, store, and/or comprise the API 562, the machine learning module 563, and/or remote execution engine 564. The API 562 may have instructions that direct and/or cause the malware security platform 510 to perform one or more operations associated with an API that interfaces a malware database, a user interface, and a remote execution engine. The machine learning module 563 may have instructions that may cause the malware security platform 510 to implement machine learning processes for determining computing devices within the private network 530 within which the environmental indicators are to be deployed, determining a priority order of environmental indicators, and or performing other operations as described with respect to FIG. 4. The remote execution engine 564 may have instructions that may cause the malware security platform 510 to send one or more inoculation messages to computing devices within the private network 530.

While FIG. 5A illustrates the malware security platform 510, the enterprise application host platform 525, the malware database 515, and the enterprise user devices 520, as being separate elements connected in the private network 530, in one or more other arrangements, functions of one or more of the above may be integrated in a single device/network of devices. For example, elements in the malware security platform 510 (e.g., host processor(s) 566, memory(s) 560, MAC processor(s) 568, PHY processor(s) 570, TX/RX module(s) 572, and/or one or more program/modules stored in memory(s) 560) may share hardware and software elements with and corresponding to, for example, the enterprise application host platform 525, the malware database 515, and/or the enterprise user devices 520.

Figure 6:
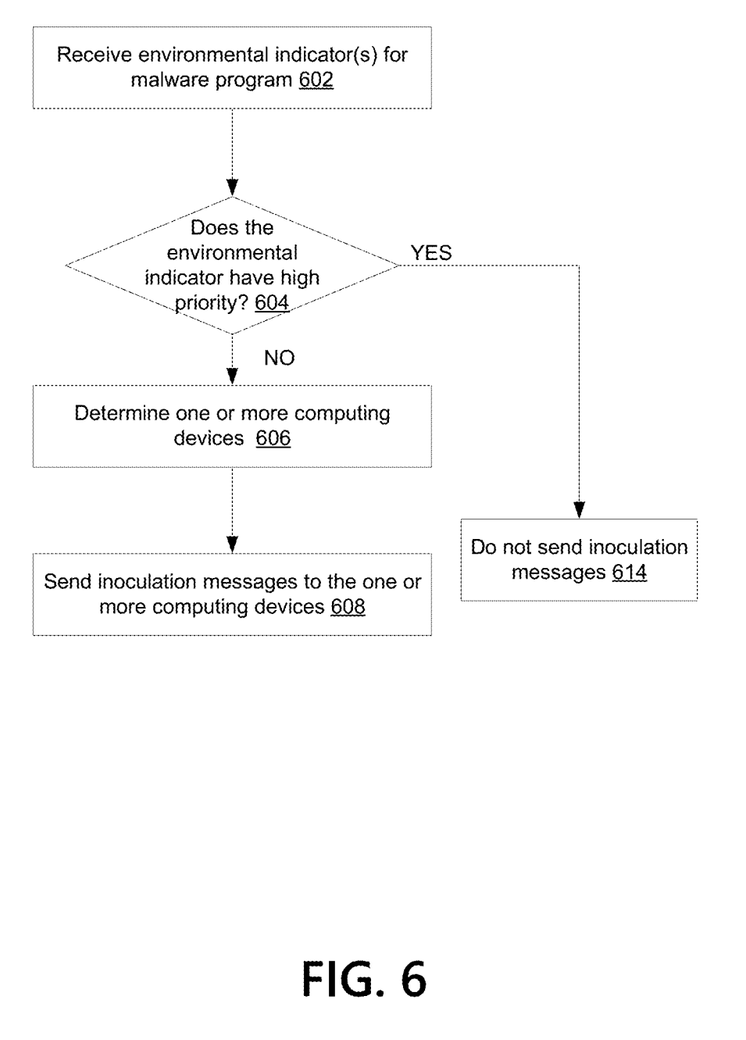
FIG. 6 shows an example algorithm performed by a malware security platform, in accordance with one or more example arrangements.

FIG. 6 shows an example algorithm performed by a malware security platform 510, in accordance with one or more example arrangements. At step 602, the malware security platform 510 may receive one or more environmental indicators associated with anti-analysis and/or target filtering mechanisms of a malware program. The one or more environmental indicators may be determined based on analysis within a sandbox environment (e.g., as may be stored in the malware database 515). The malware security platform 510 may query the malware database 515 to determine the one or more environmental indicators.

At step 604, the malware security platform 510 may determine whether the environmental indicators are prioritized environmental indicators. Determining whether the environmental indicators are prioritized environmental indicators may comprise determining whether the environmental indicators are within an upper quartile (or within any other predetermined percentile) of a priority order of environmental indicators stored in the malware database. The priority order may be determined by a machine learning module (e.g., as described with respect to FIG. 4). At step 614, and if the malware security platform 510 determines that the environmental indicators are not prioritized environmental indicators, the malware security platform 510 may determine not to send any inoculation messages to computing devices within a computing infrastructure.

At step 606, and if the malware security platform 510 determines that the environmental indicators are prioritized environmental indicators, the malware security platform 510 may determine one or more computing device to which the environmental indicators are to be sent. The determining the one or more computing devices may be based on a type of the malware program, or may be based on user input via a user interface. At step 608, the malware security platform 510 may send one or more inoculation messages to the one or more computing devices within the computing infrastructure. The one or more inoculation messages may comprise the one or more environmental indicators.

Systems, device, and methods as described herein may provide enhanced and pre-emptive protection against malware programs within a computing infrastructure. Security analysts in an enterprise organization need not expend significant amounts of time to determine how a particular malware program may operate and devise a remedy, but need only determine environmental indicators that may spoof the malware program into determining to not execute on a computing device. This may force malware developers to avoid using anti-analysis and target filtering mechanisms in malware programs, thereby making them more indiscriminate in their targeting. A more indiscriminate malware program may be easier to detect and remove before it may cause significant damage to computing networks. Further, the inoculation techniques described herein avoids the risk of deleting legitimate files as is often seen in traditional anti-malware suites.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. An apparatus comprising at least one hardware processor and a memory storing computer-readable instructions that, when executed by the at least one hardware processor, cause the apparatus to:
   query a malware database to determine an environmental indicator based on analysis of a malware program in a sandbox environment, wherein the environmental indicator is used by a target filtering mechanism associated with the malware program to prevent execution in the sandbox environment, and wherein the target filtering mechanism prevents execution of the malware program based on detection of a registry entry indicating a specified keyboard language;
   generate, based on the environmental indicator, an inoculation message for transmission to one or more computing devices in a computing network, wherein the inoculation message comprises the environmental indicator; and send, to the one or more computing devices, the inoculation message, wherein the inoculation message causes the one or more computing devices to integrate the environmental indicator into corresponding computing environments of the one or more computing devices.

2. The apparatus of claim 1, wherein the computer-readable instructions, when executed by the at least one hardware processor, cause the apparatus to determine the environmental indicator based on:

determining that the malware program has not executed within the sandbox environment, and determining that the environmental indicator corresponds to the sandbox environment.

3. The apparatus of claim 1, wherein the environmental indicator is at least one of:

a registry entry in the sandbox environment;

a file system structure of the sandbox environment;

hardware information associated with the sandbox environment; or combinations thereof.

4. The apparatus of claim 1, wherein the environmental indicator is used by an anti-analysis mechanism to prevents execution of the malware program based on detection of a registry entry indicating a malware analysis application.

5. The apparatus of claim 1, wherein the environmental indicator is a registry entry and wherein the integrating the environmental indicator comprises adding the registry entry to respective system registries of the one or more computing devices.

6. The apparatus of claim 1, wherein the malware database comprises indications of a plurality of malware programs and associated environmental indicators.

7. The apparatus of claim 1, wherein the computer-readable instructions, when executed by the at least one hardware processor, cause the apparatus to present a user interface configured to receive user input for at least one of:

modifying the malware database;

selecting the one or more computing devices; or combination thereof.

8. The apparatus of claim 1, wherein the computer-readable instructions, when executed by the at least one hardware processor, cause the apparatus to:

receive information indicating that at least a second computing device in the computing network is infected with the malware program, wherein the sending the inoculation message is based on receiving the information.

9. The apparatus of claim 1, wherein the computer-readable instructions, when executed by the at least one hardware processor, cause the apparatus to:

determine whether the environmental indicator is within a predetermined percentile of environmental indicators, in the malware database, arranged in a priority order from lowest priority to highest priority, wherein the sending the inoculation message is based on determining that the environmental indicator is within the predetermined percentile of environmental indicators.

10. The apparatus of claim 9, wherein the computer-readable instructions, when executed by the at least one hardware processor, cause the apparatus to:

determine the priority order of the environmental indicators based on respective quantities of malware programs using the environmental indicators.

11. A method at a malware security platform in a computing network, the method comprising:

querying a malware database to determine an environmental indicator based on analysis of a malware program in a sandbox environment, wherein the environmental indicator is used by a target filtering mechanism associated with the malware program to prevent execution in the sandbox environment, and wherein the target filtering mechanism prevents execution of the malware program based on detection of a registry entry indicating a specified keyboard language;

generate, based on the environmental indicator, an inoculation message for transmission to one or more computing devices in the computing network, wherein the inoculation message comprises the environmental indicator; and sending, to the one or more computing devices, the inoculation message, wherein the inoculation message causes the one or more computing devices to integrate the environmental indicator into corresponding computing environments of the one or more computing devices.

12. The method of claim 11, wherein the determining the environmental indicator is based on:

determining that the malware program has not executed within the sandbox environment, and determining that the environmental indicator corresponds to the sandbox environment.

13. The method of claim 11, wherein the environmental indicator is at least one of:

a registry entry of the sandbox environment;

file system structure of the sandbox environment; or hardware information associated with the sandbox environment.

14. The method of claim 11, wherein the malware database comprises indications of a plurality of malware programs and associated environmental indicators.

15. The method of claim 11, further comprising presenting a user interface configured to receive user input for:

modifying the malware database; or selecting the one or more computing devices.

16. The method of claim 11, further comprising:

receiving information indicating that at least a second computing device in the computing network is infected with the malware program, wherein the sending the inoculation message is based on receiving the information.

17. The method of claim 11, further comprising:

determining whether the environmental indicator is within a predetermined percentile of environmental indicators, in the malware database, arranged in a priority order from lowest priority to highest priority, wherein the sending the inoculation message is based on determining that the environmental indicator is within the predetermined percentile of environmental indicators.

18. The method of claim 17, further comprising:

determining the priority order of the environmental indicators based on respective quantities of malware programs using the environmental indicators.

19. A non-transitory computer readable medium storing computer executable instructions that, when executed by a processor, cause a malware security platform to perform:

querying a malware database to determine an environmental indicator based on analysis of a malware program in a sandbox environment, wherein the environmental indicator is used by a target filtering mechanism associated with the malware program to prevent execution in the sandbox environment, and wherein the target filtering mechanism prevents execution of the malware program based on detection of a registry entry indicating a specified keyboard language;

generate, based on the environmental indicator, an inoculation message for transmission to one or more computing devices in a computing network, wherein the inoculation message comprises the environmental indicator; and sending, to the one or more computing devices, the inoculation message, wherein the inoculation message causes the one or more computing devices to integrate the environmental indicator into corresponding computing environments of the one or more computing devices.

* * * * *